(12) United States Patent
Farahani et al.

(10) Patent No.: US 10,310,997 B2
(45) Date of Patent: Jun. 4, 2019

(54) SYSTEM AND METHOD FOR DYNAMICALLY ALLOCATING MEMORY TO HOLD PENDING WRITE REQUESTS

(71) Applicant: Advanced Micro Devices, Inc., Sunnyvale, CA (US)

(72) Inventors: Amin Farmahini Farahani, Sunnyvale, CA (US); David A. Roberts, Sunnyvale, CA (US); Nuwan Jayasena, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 68 days.

(21) Appl. No.: 15/273,013

(22) Filed: Sep. 22, 2016

(65) Prior Publication Data
US 2018/0081590 A1 Mar. 22, 2018

(51) Int. Cl.
*G06F 12/0802* (2016.01)
*G06F 13/16* (2006.01)

(52) U.S. Cl.
CPC ...... *G06F 13/1673* (2013.01); *G06F 12/0802* (2013.01); *G06F 2212/60* (2013.01)

(58) Field of Classification Search
CPC .................................................. G06F 12/0802
USPC .......................................................... 711/154
See application file for complete search history.

(56) References Cited

U.S. PATENT DOCUMENTS

| | | | | |
|---|---|---|---|---|
| 8,296,534 | B1* | 10/2012 | Gupta | G06F 12/0804 711/103 |
| 2008/0189452 | A1* | 8/2008 | Merry | G06F 3/061 710/56 |
| 2011/0066820 | A1* | 3/2011 | Blundell | G06F 9/3842 711/163 |
| 2012/0047332 | A1* | 2/2012 | Bannon | G06F 12/0804 711/135 |
| 2014/0019707 | A1* | 1/2014 | Benhase | G06F 12/023 711/171 |
| 2015/0331619 | A1* | 11/2015 | Zheng | G06F 3/0613 711/154 |
| 2017/0286114 | A1* | 10/2017 | Herdrich | G06F 9/30043 |

OTHER PUBLICATIONS

U.S. Appl. No. 14/862,030, filed Sep. 22, 2015, listing, Kapil Dev et al. as inventor(s), entitled "Configuring Fast Memory as Cache for Slow Memory".

(Continued)

*Primary Examiner* — Guatam Sain

(57) ABSTRACT

A processing system employs a memory module as a temporary write buffer to store write requests when a write buffer at a memory controller reaches a threshold capacity, and de-allocates the temporary write buffer when the write buffer capacity falls below the threshold. Upon receiving a write request, the memory controller stores the write request in a write buffer until the write request can be written to main memory. The memory controller can temporarily extend the memory controller's write buffer to the memory module, thereby accommodating temporary periods of high memory activity without requiring a large permanent write buffer at the memory controller.

19 Claims, 4 Drawing Sheets

(56) References Cited

OTHER PUBLICATIONS

C. Chou, et al., "BEAR: Techniques for Mitigating Bandwidth Bloat in Gigascale DRAM Caches, In Proceedings of the 42nd Annual International Symposium on Computer Architecture", Jun. 13-17, 2015, pp. 198-210. ACM.

M.K. Qureshi, et al., "Fundamental Latency Trade-off in Architecting DRAM Caches: Outperforming Impractical SRAM-tags With a Simple and Practical Design," In Proceedings of the 2012 45th Annual IEEE/ACM International Symposium on Microarchitecture, IEEE Computer Society, 2012, pp. 235-246.

G.H. Loh, et al., "Efficiently Enabling Conventional Block Sizes for Very Large Die-Stacked DRAM Caches", In Proceedings of the 44th Annual IEEE/ACM International Symposium on Microarchitecture. ACM, 2011, pp. 154-464.

G.M. Loh, et al., "Supporting Very Large DRAM Caches With Compound Access Scheduling and Missmap," IEEE Micro, vol. 32, No. 3, 2012, pp. 70-78.

\* cited by examiner

SYSTEM AND METHOD FOR DYNAMICALLY ALLOCATING MEMORY TO HOLD PENDING WRITE REQUESTS

GOVERNMENT LICENSE RIGHTS

This invention was made with government support under Prime Contract Number DE-AC52-07NA27344, Subcontract No. B608045 awarded by the Department of Energy (DOE). The Government has certain rights in this invention.

BACKGROUND

Description of the Related Art

To support execution of instructions at a processor, a processing system typically includes a processor and a memory subsystem including memory modules to store data to be accessed by the executing instructions. To facilitate processing efficiency, the memory subsystem can be organized into a memory hierarchy having main memory at the top of the hierarchy to store all data that can be accessed by the executing instructions, and one or more caches at lower levels of the memory hierarchy to store subsets of the data stored at main memory. In the course of executing instructions, the processor generates operations, referred to as memory access requests, to store (a write operation) or load (a read operation) data from the memory hierarchy. To facilitate memory access efficiency, write operations to the main memory are typically stored temporarily in a write buffer at a memory controller (e.g., a northbridge) until they are ready to be processed at the memory modules of main memory. However, in some scenarios, write requests to main memory are received at the memory controller more quickly than the requests can be processed at the main memory. For example, such scenarios can arise frequently in processing systems that employ a non-uniform memory access (NUMA) architecture wherein at least a portion of main memory is composed of non-volatile memory modules, such as flash memory. The non-volatile memory modules have a relatively low write bandwidth, such that the write buffer of the memory controller can fill up during periods of high memory activity. To prevent write requests from being lost, the processing system can suspend execution of program threads until space becomes available in the write buffer, but this negatively impacts processing system performance.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for allocating a portion of a memory module as a temporary write buffer to store write requests when a write buffer at a memory controller reaches an occupancy threshold, and de-allocating the temporary write buffer when the write buffer occupancy falls below the threshold. To illustrate, upon receiving a write request, a memory controller stores the write request in a write buffer until the write request can be written to main memory. Because of relatively low write bandwidth at main memory (because, for example, the main memory employs some relatively slower memory modules, referred to herein as "slow memory", such as non-volatile memory modules), the write buffer may fill to capacity in write-intensive applications, resulting in a bottleneck that can slow or prevent processing of additional instructions. Accordingly, using the techniques described herein, the memory controller can temporarily extend the memory controller's write buffer to relatively faster memory modules, referred to herein as "fast memory", such as volatile memory modules of main memory, thereby accommodating temporary periods of high memory activity without requiring a large permanent write buffer at the memory controller. The techniques described herein thereby provide for increased processing efficiency without increasing the size or power consumption of the memory controller and corresponding processing system.

Figure 1:
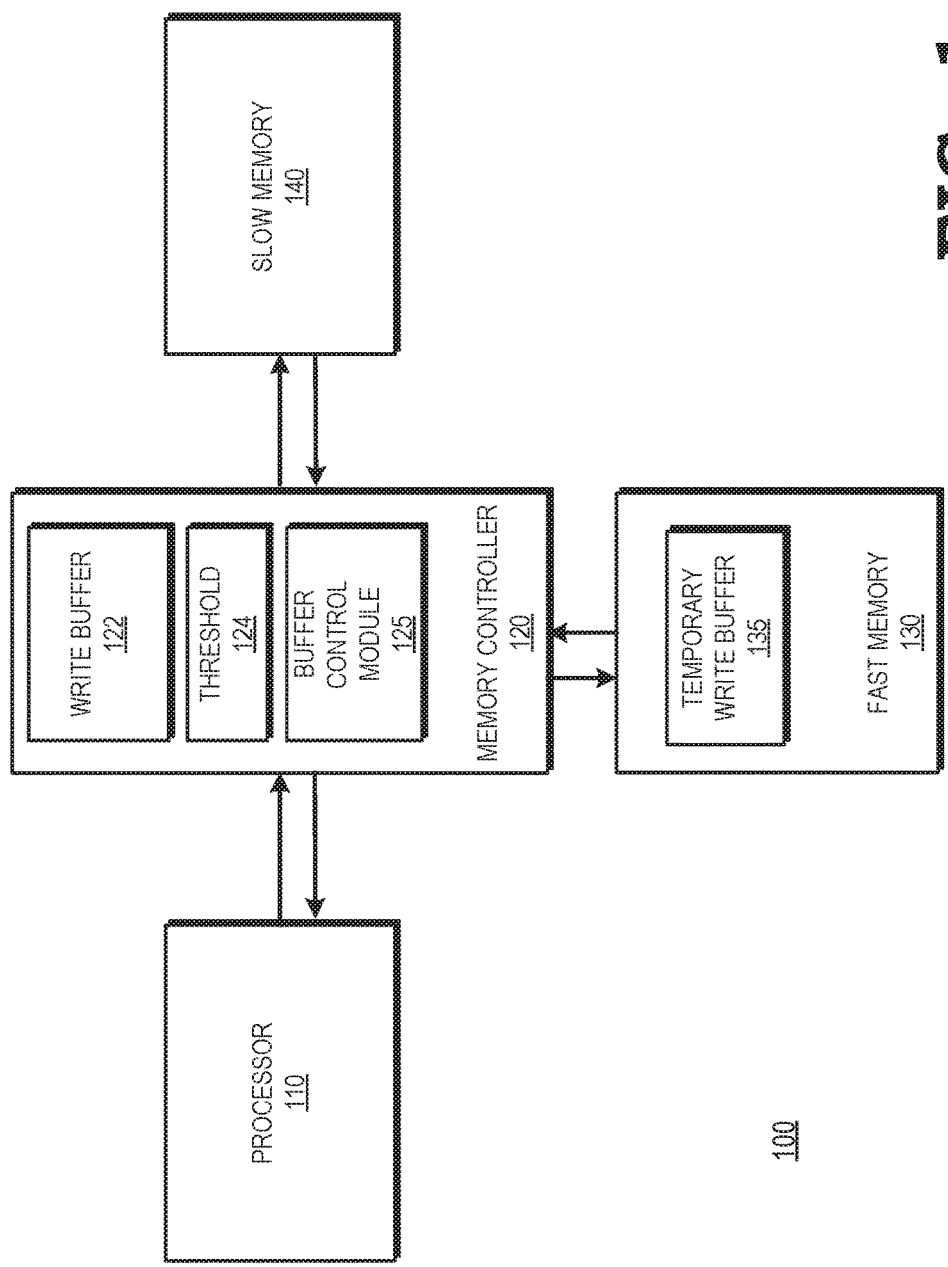
FIG. 1 is a block diagram of a processing system that allocates a portion of a memory module as a temporary buffer to store write requests when a write buffer of a memory controller reaches an occupancy threshold in accordance with some embodiments.

FIG. 1 illustrates a processing system that allocates a portion of a fast memory to store write requests when a write buffer reaches an occupancy threshold in accordance with some embodiments. The processing system 100 is generally configured to execute sets of operations organized in the form of computer programs in order to carry out tasks on behalf of an electronic device. Accordingly, the processing system 100 may be used in any of a variety of electronic devices, such as a desktop or laptop computer, server, smartphone, tablet, game console, and the like.

To facilitate execution of instructions, the processing system 100 includes a processor 110, a memory controller 120 including a write buffer 122 having a threshold 124 and a buffer control module 125, a fast memory 130, and a slow memory 140. In some embodiments, the processing system 100 may further include one or more additional memory caches and a main memory (not shown), each of which is a memory device generally configured to store data, and therefore includes one or more of random access memory (RAM) memory modules, non-volatile memory devices (e.g., flash memory), and the like.

The processor 110 includes one or more instruction pipelines to execute instructions, organized in the form of computer programs, thereby carrying out tasks on behalf of an electronic device. While the processor 110 may have some amount of integral memory, for example, in the form of registers, such memory is typically limited in storage capacity. Accordingly, in order to execute instructions, the processor 110 stores and retrieves data from the memory hierarchy of the processing system 100. As noted above, the memory hierarchy includes one or more caches (not shown) that compose the lower levels of the memory hierarchy, and main memory that resides at the top of the memory hierarchy and typically stores all or a relatively large portion of data that is expected to be accessed by programs executing at the processor 110. In the example of FIG. 1, the processing system 100 employs a non-uniform memory access (NUMA) architecture for main memory, whereby main memory is composed of memory modules having different memory architectures. Thus, in the depicted example, main memory is composed of fast memory 130, such as dynamic random access memory (DRAM), and slow memory 140, such as non-volatile memory. The NUMA architecture supports more flexible and robust data storage at main memory while maintaining processing efficiency. It will be appreciated that the techniques described herein can be applied to other processing systems having different memory architectures, and that the techniques described herein can be applied to other levels of a memory hierarchy, such as a processor cache.

To access the memory hierarchy of the processing system 100, the processor 110 generates operations, referred to as memory access requests, to store (a write operation) or load (a read operation) data from the memory hierarchy, and provides the memory access requests to the memory controller 120 for processing. As described further herein, the memory controller 120 works together with the one or more modules of fast memory 130 and slow memory 140 to satisfy the memory access requests. Although for purposes of illustration two modules of memory are depicted in FIG. 1, it will be appreciated that the processing system 100 may include more than two modules of memory and may use any memory technology.

The memory controller 120 is configured to receive memory access requests for data from the processor 110 and read and write data to memory. In the case of a read operation, the memory controller 120 provides the requested cache line from the corresponding cache to the processor 110. In the case of a write operation, the memory controller 120 stores the write data to the cache entry of the cache. If the requested cache line is not found in the caches of the memory hierarchy, a cache miss has occurred. In the event of a cache miss, the memory controller 120 satisfies the memory access request at main memory. In particular, in the case of a read operation, the memory controller 120 retrieves the requested cache line from one of the fast memory 130 and the slow memory 140, stores it in one or more caches of the memory hierarchy, and provides the cache line (or a portion thereof) to the processor 110, thereby satisfying the read operation. In the case of a write operation, the memory controller 120 provides the corresponding write data and write address to one of the fast memory 130 and slow memory 140 to write the data to the entry corresponding to the write address.

The fast memory 130 and slow memory 140 can each process a write request at a corresponding rate, referred to herein as the write bandwidth for the memory. In some embodiments, the fast memory 130 has a relatively fast write bandwidth, while the slow memory 140 has a relatively slow write bandwidth. In some situations, such as when several program threads are actively executing at the processor 110, the memory controller 120 can receive write requests at a rate that exceeds the write bandwidth for one or both of the fast memory 130 and the slow memory 140. Further, the fast memory 130 and slow memory 140 can each process a read request at a corresponding rate, referred to herein as the read bandwidth for the memory. In some embodiments, the read bandwidth of one or both of the fast memory 130 and slow memory 140 is relatively faster than the write bandwidth of one or both of the fast memory 130 and slow memory 140.

The memory controller 120 includes a write buffer 122 to store write requests awaiting processing at one of the fast memory 130 and the slow memory 140. By grouping together write requests at the write buffer 122, the memory controller 120 prevents the pending write requests from blocking pending read requests. In at least one embodiment, the write buffer 122 is implemented as a queue configured to store pending write requests in order as they are received from the processor 110. In at least one embodiment, the write buffer 122 is implemented in any form of memory that has faster write bandwidth than slow memory 140, and slow memory 140 is implemented in any form of memory, including volatile memory, that has slower write bandwidth than the write buffer 122. As the fast memory 130 and slow memory 140 complete processing of write requests, they provide control signaling to the memory controller 120 that they are ready for another write request. In response, the memory controller 120 selects the next write request for the corresponding memory from the write buffer 122, and provides it to the corresponding memory.

In some situations, such as during periods of heavy write access to the slow memory 140, the write buffer 122 is filled to capacity. In response, and as described further herein, the memory controller 120 allocates space at the fast memory 130 as a temporary write buffer 135 to store write access requests. The temporary write buffer 135 effectively becomes an extension of the write buffer 122, allowing the memory controller 120 to store additional write requests during periods of high memory activity without implementing a permanent increase in the size of the write buffer 122. The processing system 100 thereby maintains processing efficiency during periods of high memory activity while maintaining a relatively small circuit footprint and low power consumption.

To facilitate implementation of the temporary write buffer 135, the memory controller 120 includes a threshold 124 and a buffer control module 125. The threshold 124 is a programmable value stored at a register or other storage module that indicates a condition under which the temporary write buffer 135 may come into effect. In at least one embodiment, the threshold 124 is implemented as a number of pending write requests stored in the write buffer 122. Alternatively, in other embodiments the threshold 124 is implemented as a ratio of write buffer entries filled with valid pending write requests to write buffer entries not filled with valid pending write requests such as, for example, vacant write buffer entries or write buffer entries filled with invalid pending write requests.

The buffer control module 125 is configured to control storage of pending write requests in the write buffer 122 and at the temporary write buffer 135. To illustrate, the buffer control module 125 is configured to compare the number of write requests stored at the write buffer 122 to the threshold 124 and, in response to determining that the number of write requests stored at the write buffer 122 meets or exceeds the threshold 124, allocate a portion of fast memory 130 to form temporary write buffer 135. In at least one embodiment, the buffer control module 125 allocates the temporary write buffer 135 by issuing a request having parameters, such as the size of the requested temporary write buffer. In at least one embodiment, the parameters may include a requested set of addresses of the entries of the fast memory 130 that are to compose the temporary write buffer 135. In at least one embodiments, the range of addresses and their sizes could be predetermined or configured by the operating system, programmer, or compiler. The buffer control module 125 issues the request and corresponding parameters to a memory management entity (not shown) for the processing system 100, such as an operating system (not shown) or a managed memory module (e.g., processing-in-memory or PIM) (not shown). In at least one embodiment, the buffer control module 125 determines the amount of fast memory 130 to allocate to store write requests based on the rate of incoming write requests compared to the rate at which write requests are written to slow memory 140, the expected or measured rate at which write requests are emptied from the write buffer 122, or a combination thereof.

In response to the request from the buffer control module 125 to allocate a portion of fast memory 130 to store write requests, the memory management entity (not shown) compares the request parameters to the amount of available memory (e.g., memory entries that are vacant) in the fast memory 130 to determine if there are sufficient available entries to form the requested temporary write buffer 135. If so, the memory management entity indicates to the buffer control module 125 that the requested entries have been allocated as a temporary write buffer 135 and specifies the start and end location of the temporary write buffer 135. In at least one embodiment, the memory management entity may allocate multiple non-contiguous memory address ranges of fast memory 130 as a temporary write buffer 135. By allocating non-contiguous memory address ranges of fast memory 130 as the temporary write buffer 135, the memory management entity can flexibly allocate sufficient available entries to form the requested temporary write buffer 135 while preserving for other uses memory addresses between the non-contiguous memory address ranges which are already storing valid data.

If there are not sufficient available entries for the requested temporary write buffer 135, the memory management entity (not shown) either denies the request or selects one or more memory pages from the fast memory 130 to transfer, or page out, to other memory (not shown) to make room for the requested temporary write buffer 135. After making room for the requested temporary write buffer 135, the memory management entity (not shown) indicates to the buffer control module 125 that the requested entries have been allocated as a temporary write buffer 135 and specifies the start and end location of the temporary write buffer 135. During the time that the temporary write buffer 135 is allocated to store write requests, the memory management entity (not shown) ensures that no virtual address is mapped to the memory locations in fast memory 130 that have been allocated as the temporary write buffer 135, thereby ensuring that write requests stored at the temporary write buffer 135 are not overwritten.

In at least one embodiment, the buffer control module 125 is further configured to de-allocate some or all of the temporary write buffer 135 when the number of write requests stored at the write buffer 122 falls below the threshold 124. In some embodiments, the threshold 124 for de-allocation of the temporary write buffer 135 could be different from the threshold used to allocate the temporary write buffer 135. The de-allocation of the temporary write buffer 135 could happen immediately right after writing write requests from the temporary write buffer 135 to slow memory 140 or it could happen after a programmable time period with no write request occupancy in portion or all of the temporary write buffer 135. Upon de-allocation, the portion of the temporary write buffer 135 that has been de-allocated is re-allocated and released to the memory management entity to be used as main memory, and in particular to store data that can be targeted by memory access requests generated at the processor 110. Thus, at least a subset of the entries the fast memory 130 are dynamically allocated and de-allocated to be part of the memory hierarchy of the processing system 100 (and therefore store data to be accessed by programs executing at the processor 110) or to compose the temporary write buffer 135, depending on the number of write requests stored at the write buffer 122, and the proximity of that number of write requests to the threshold 124.

In some embodiments, the processing system 100 may also include a write request index (not shown) configured to track write requests stored in the write buffer 122 or temporary write buffer 135. In at least one embodiment, the write request index is implemented as one of a Bloom filter, address hash table, cache tag table, and the like. In at least one embodiment, the write request index (not shown) is implemented in the temporary write buffer 135. In another embodiment, the write request index is implemented as a dedicated index in a faster memory such as on-chip static random access memory (SRAM). As memory access requests are received by the memory controller 120, the buffer control module 125 checks the write request index (not shown) to determine if data associated with each received memory access request is stored in the write buffer 122 or temporary write buffer 135. If data associated with a received memory access request is stored in the write buffer 122 or temporary write buffer 135, the buffer control module 125 accesses the data associated with the received memory access request where it is stored in the write buffer 122 or temporary write buffer 135. In this manner, the processing system 100 can more efficiently read or write to the most recent version of the data associated with the received memory access request and avoid duplicative transfers of data to and from fast memory 130 or slow memory 140.

To illustrate, in operation, upon receiving a write request from the processor 110, the buffer control module 125 of the memory controller 120 compares the capacity of the write buffer 122 to the threshold 124. If the occupancy of the write buffer 122 is below the threshold 124, the buffer control module 125 stores the write request in the write buffer 122 until the write request can be written to slow memory 140. If the occupancy of the write buffer 122 is at the threshold 124, the buffer control module 125 allocates a portion of the fast memory 130 as a temporary write buffer 135 to store the write request until the write request can be written to slow memory 140.

Upon receiving an additional memory access request, the memory controller 120 determines whether data associated with the memory access request is stored in either the write buffer 122 or the temporary write buffer 135, if a temporary write buffer 135 has been allocated. If data associated with the memory access request is stored in either the write buffer 122 or the temporary write buffer 135, the memory controller accesses the requested data where the data is stored in the write buffer 122 or the temporary write buffer 135. If the memory access request is a write request that is not associated with data stored in the write buffer 122 or the temporary write buffer 135, the memory controller stores the write request in the write buffer 122 if the write buffer capacity is below the threshold 124, or in the temporary write buffer 135 if the capacity of the write buffer 122 is at the threshold 124. If the occupancy of the temporary write buffer 135 is full, the buffer control module 125 allocates an additional portion of the fast memory 130 to store the write request.

As write requests stored in the write buffer 122 are written to slow memory 140, they are emptied or drained from the write buffer 122. If the occupancy of the write buffer 122 falls below the threshold 124, the buffer control module 125 de-allocates some or all of the temporary write buffer 135. Upon de-allocation, the portion of the temporary write buffer 135 that has been de-allocated resumes the storage and other functions it had been performing prior to being allocated to store write requests.

Figure 2:
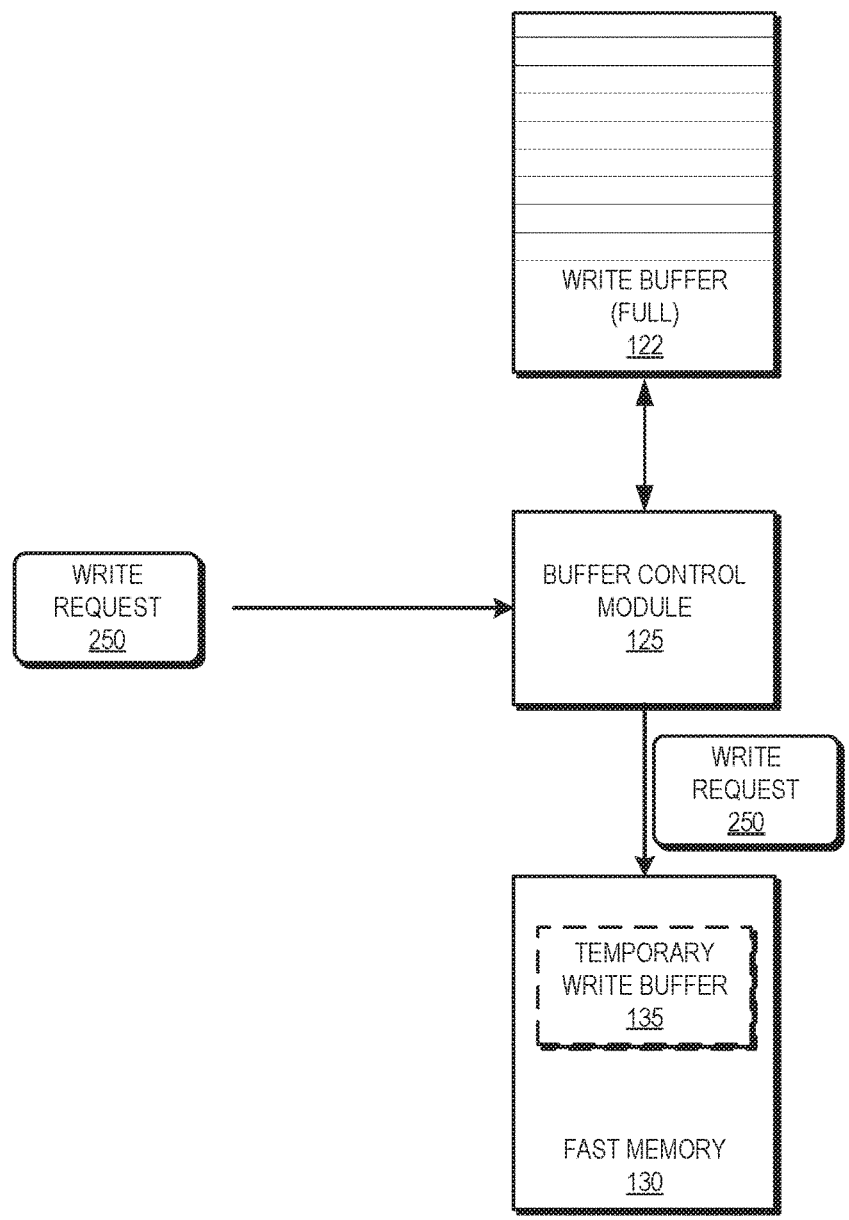
FIG. 2 is a block diagram of an example of the buffer control module of FIG. 1 receiving a write request and storing it at the temporary buffer in accordance with some embodiments.

FIG. 2 illustrates an example of the buffer control module 125 of FIG. 1 receiving a write request and storing it at a portion of fast memory temporarily allocated to store write requests when the write buffer 122 has reached an occupancy threshold in accordance with some embodiments. In the depicted example, the buffer control module 125 receives a write request 250 from the processor 110 (not shown at FIG. 2). The buffer control module 125 compares the occupancy of the write buffer 122 to a threshold (not shown). In the example of FIG. 2, it is assumed that the number of write requests stored at the write buffer 122 is at the threshold, indicating that the write buffer 122 is full and not available to accept additional write requests.

In response to the number of write requests exceeding the threshold, the buffer control module 125 stores the write request 250 in a portion of the fast memory 130 that has previously been allocated as a temporary write buffer 135. If a portion of the fast memory 130 has not been allocated as the temporary write buffer, or if the number of write requests stored at the temporary write buffer 135 has reached a threshold (not shown), the buffer control module 125 allocates a portion (or an additional portion, if the temporary write buffer 135 has already been allocated but has reached an occupancy threshold) of the fast memory 130 to store the write request 250.

Figure 3:
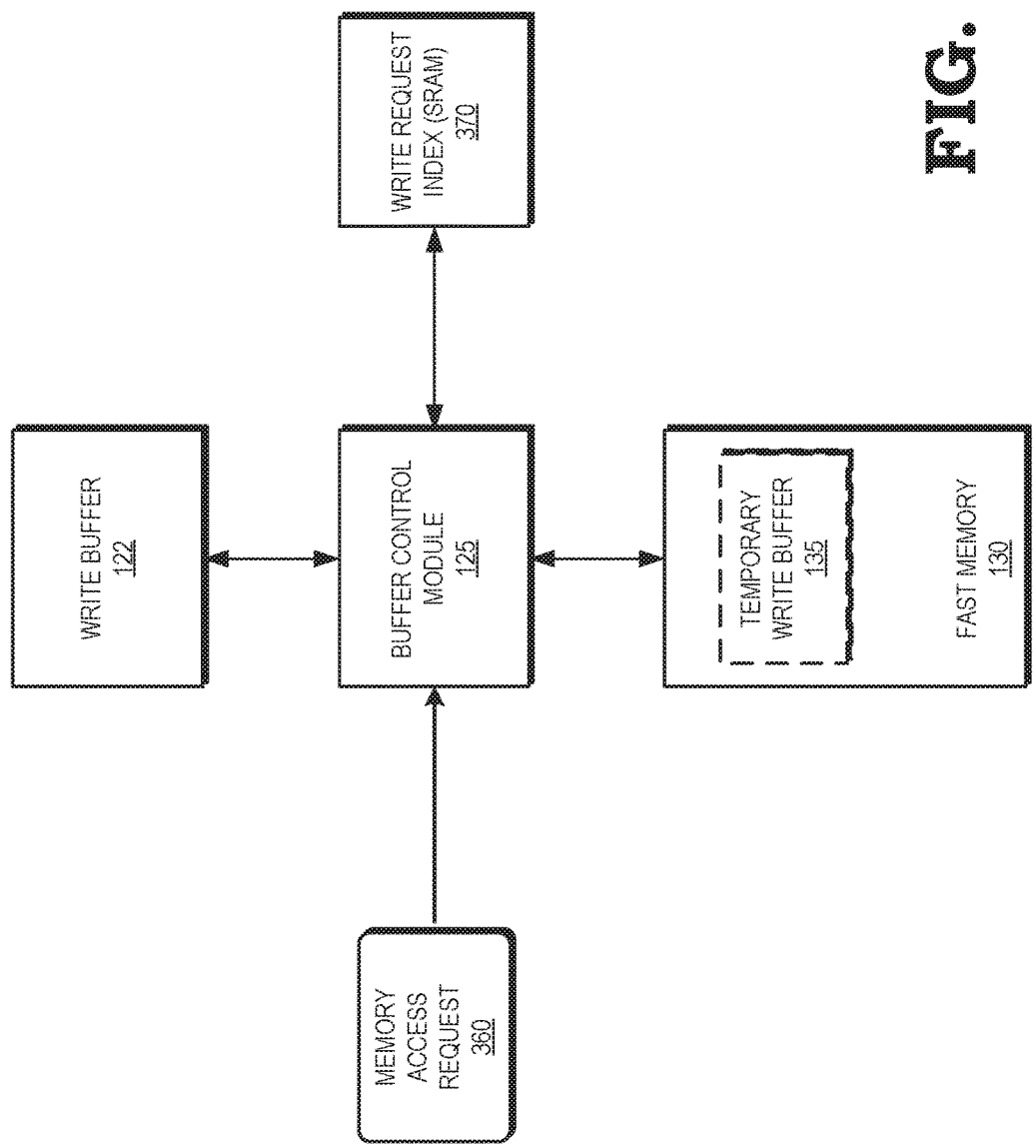
FIG. 3 is a block diagram of an example of the buffer control module of FIG. 1 receiving a memory access request and checking a write request index to determine if data associated with the memory access request is stored in the temporary buffer in accordance with some embodiments.

FIG. 3 illustrates an example of the buffer control module of FIG. 1 receiving a memory access request 360 and checking a write request index (SRAM) 370 to determine if data associated with the memory access request 360 is stored in the write buffer 122 or in the temporary write buffer 135. The memory controller 120 employs the write request index 370 to indicate the memory addresses corresponding to the write requests stored at both the write buffer 122 and the temporary write buffer 135. In some embodiments, this allows the memory controller 120 to more efficiently process memory access requests. For example, in the case of a read access request corresponding to a stored write request, the memory controller 120 can satisfy the read access request from the corresponding write buffer, rather than waiting until the write request has been processed at the corresponding memory module. In the case of a received write request corresponding to a stored write request, the memory controller 120 can replace the stored write request with the received write request. The memory controller 120 thereby prevents relatively wasteful writes of data that is to be subsequently overwritten by another pending write access.

To illustrate, in operation the buffer control module 125 receives a memory access request 360 from the processor (not shown). The buffer control module 125 queries the write request index (SRAM) 370, which in at least one embodiment is implemented as a Bloom filter, to confirm or request an indication of whether data associated with the memory access request 360 may be stored in the write buffer 122 or in the temporary write buffer 135. If the write request index (SRAM) 370 is implemented as a Bloom filter, the write request index (SRAM) 370 indicates the possible presence of the data associated with the memory access request in the write buffer 122 or in the temporary write buffer 135. If the write request index (SRAM) 370 indicates the possible presence of the requested data in the write buffer 122 or in the temporary write buffer 135, the buffer control module 125 performs a full index lookup to confirm whether the requested data is actually stored in the write buffer 122 or in the temporary write buffer 135. In at least one embodiment, the full index is stored in the temporary write buffer 135. If the write request index (SRAM) 370 does not indicate the possible presence of the requested data in the write buffer 122 or in the temporary write buffer 135, the buffer control module 125 does not perform a full index lookup to confirm whether the requested data is actually stored in the write buffer 122 or in the temporary write buffer 135. Thus, implementation of the write request index (SRAM) 370 as a Bloom filter may reduce the number of full index lookups by the buffer control module 125. If the write request index (SRAM) 370 or a full index lookup by the buffer control module 125 confirms that the requested data is stored in the write buffer 122 or in the temporary write buffer 135, the buffer control module 125 accesses the requested data at the location where it is stored in the write buffer 122 or in the temporary write buffer 135.

If the write request index (SRAM) 370 indicates that the requested data is stored in neither the write buffer 122 nor in the temporary write buffer 135, the buffer control module 125 determines whether the memory access request 360 is a write request. If the memory access request 360 is a write request, the buffer control module 125 stores the write request in the write buffer 122, if the occupancy of the write buffer 122 has not reached a threshold (not shown). If the memory access request 360 is a write request and the occupancy of the write buffer 122 has reached a threshold (not shown), the buffer control module 125 stores the write request in the portion of the fast memory 130 that has been allocated as a temporary write buffer 135 to store write requests and updates the write index 370 to indicate that the write request is stored at one of the write buffer 122 or the temporary write buffer 135.

Figure 4:
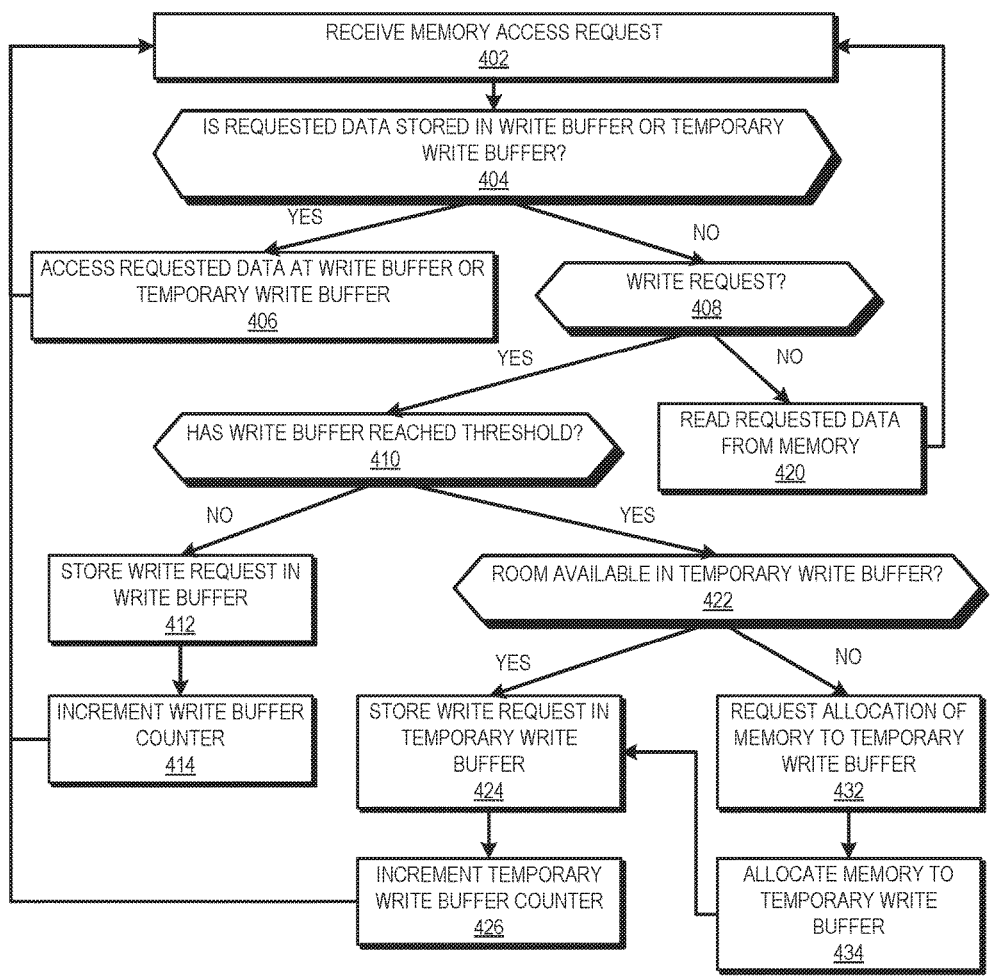
FIG. 4 is a flow diagram illustrating a method for allocating a portion of a memory module as a temporary buffer to store write requests in accordance with some embodiments.

FIG. 4 is a flow diagram illustrating a method 400 for managing a temporary write buffer such as the temporary write buffer 135 of FIG. 1 in accordance with some embodiments. At block 402, the buffer control module 125 receives a memory access request from the processor 110. At block 404, the buffer control module 125 queries the write request index 370 to determine if data associated with the memory access request is stored in the write buffer 122 or in the temporary write buffer 135. If the buffer control module 125 determines that data associated with the memory access request is stored in the write buffer 122 or in the temporary write buffer 135, at block 406 the buffer control module 125 accesses the requested data where it is stored in the write buffer 122 or in the temporary write buffer 135. After accessing the requested data, the buffer control module 125 receives the next memory access request at block 402.

If the buffer control module 125 determines that data associated with the memory access request is not stored in the write buffer 122 or in the temporary write buffer 135 (block 404), at block 408 the buffer control module 125 determines whether the memory access request is a write request. If the memory access request is a not a write request (i.e., if the memory access request is a read request), at block 420 the memory controller 120 loads the requested data from the location where it is stored in either fast memory 130 or slow memory 140. After loading the requested data, the memory controller 120 receives the next memory access request at block 402.

If, at block 408, the memory access request is a write request, at block 410 the buffer control module 125 compares the number of write requests stored at the write buffer 122 to the threshold 124 to determine if the occupancy of the write buffer 122 has reached the threshold 124. In at least one embodiment, the buffer control module 125 maintains a write buffer counter to indicate the number of write requests stored at the write buffer 122. If the number of write requests stored at the write buffer 122 has not reached the threshold 124, at block 412 the buffer control module 125 stores the write request in the write buffer 122. In at least one embodiment, at block 414, the buffer control module increments the write buffer counter to indicate that a write request has been stored in the write buffer 122. Once the buffer control module has stored the write request in the write buffer 122 in block 412 and, in some embodiments, incremented the write buffer counter in block 414, the memory controller 120 receives the next memory access request at block 402. Concurrent with receiving additional memory access requests, the memory controller 120 may execute write requests stored at the write buffer 122. In response to the memory controller executing a write request, the buffer control module 125 decrements the write buffer counter (not shown at FIG. 4). Thus, the write buffer counter maintains a count indicative of the number of write requests pending at the write buffer 122.

If, at block 410, the buffer control module 125 determines that the occupancy of the write buffer 122 has reached the threshold 124, at block 422 the buffer control module 125 determines if there is room available in the temporary write buffer 135 to store the write request. If there is room available in the temporary write buffer 135, at block 424 the buffer control module 125 stores the write request in the temporary write buffer 135. In at least one embodiment, at block 426, the buffer control module 125 increments a temporary write buffer counter to indicate that a write request has been stored in the temporary write buffer 135. Once the buffer control module 125 has stored the write request in the temporary write buffer 135 in block 424 and, in some embodiments, incremented a write buffer counter in block 426, the memory controller 120 receives the next memory access request at block 402. Concurrent with receiving additional memory access requests, the memory controller 120 may execute write requests stored at the temporary write buffer 135. In response to the memory controller executing a write request, the buffer control module 125 decrements the temporary write buffer counter (not shown at FIG. 4). Thus, the temporary write buffer counter maintains a count indicative of the number of write requests pending at the temporary write buffer 135.

If, at block 422, the buffer control module 125 determines that there is not room available in the temporary write buffer 135 to store the write request (e.g., by comparing the value of the temporary write buffer counter to a threshold and determining that the value of the counter has reached the threshold), or if a temporary write buffer has not yet been allocated, at block 432 the buffer control module 125 requests that the operating system or managed memory module allocate a portion (or an additional portion) of fast memory 130 as a temporary write buffer to store write requests. At block 434, the operating system or managed memory module allocates a portion or additional portion of fast memory 130 as a temporary write buffer to store write requests. Once a portion of fast memory 130 has been allocated to store write requests, the buffer control module 125 stores the write request in the temporary write buffer 135 at block 424.

In some embodiments, certain aspects of the techniques described above may implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   receiving a first memory access request to write data to a first memory;
   storing the first memory access request in a write buffer;
   in response to the write buffer associated with the first memory storing a threshold number of write requests, allocating by a memory controller a portion of a second memory to store additional write requests, the second memory different from the first memory, the second memory configured to store data responsive to a write request; and
   in response to a number of write requests stored in the write buffer falling below the threshold number of write requests, de-allocating by the memory controller the portion of the second memory.

2. The method of claim 1, further comprising:
   in response to receiving at the memory controller a second memory access request for data associated with a first address while the portion of the second memory is allocated to store write requests, determining whether the portion of the second memory contains data associated with the first address; and
   in response to determining that the portion of the second memory contains data associated with the first address, accessing the data associated with the first address contained in the portion of the second memory.

3. The method of claim 2, wherein determining whether the portion of the second memory contains data associated with the first address comprises checking a write request index at a third memory, the third memory different from the first memory and the second memory.

4. The method of claim 1, wherein the first memory is non-volatile memory.

5. The method of claim 4, wherein the second memory is volatile memory.

6. The method of claim 1, wherein allocating the portion of the second memory to store write requests comprises implementing the portion of the second memory as a queue.

7. The method of claim 1, wherein allocating the portion of the second memory to store write requests comprises implementing the portion of the second memory as a hash table.

8. The method of claim 1, wherein allocating the portion of the second memory to store write requests comprises implementing the portion of the second memory as a cache.

9. A method comprising:
   in response to receiving a first memory access request for data associated with a first address of a first memory while a portion of a second memory is allocated to store write requests, determining whether a write buffer or the portion of the second memory contains data associated with the first address, the second memory different from the first memory, the second memory configured to store data responsive to a second memory access request; and
   in response to determining that the write buffer or the portion of the second memory contains data associated with the first address, accessing the data associated with the first address contained in the write buffer or the portion of the second memory.

10. The method of claim 9, further comprising:
    in response to the write buffer reaching a threshold capacity, storing the first memory access request at the portion of the second memory.

11. The method of claim 10, further comprising:
    in response to the portion of the second memory not having availability to store the first memory access request, allocating an additional portion of the second memory to store the first memory access request.

12. A device comprising:
    a memory controller;
    a write buffer associated with a first memory; and
    a second memory different from the first memory and configured to store data in response to a first memory access request;
    wherein the memory controller is configured to:
       allocate a portion of the second memory to store memory access requests in response to the write buffer reaching a threshold capacity; and
       de-allocate the portion of the second memory in response to the write buffer falling below the threshold capacity.

13. The device of claim 12, wherein, in response to receiving a second memory access request for data associated with a first address while the portion of the second memory is allocated to store memory access requests, the memory controller is further configured to access data associated with the first address contained in the portion of the second memory in response to determining that the portion of the second memory contains data associated with the first address.

14. The device of claim 13, further comprising a write request index to indicate whether the portion of the second memory contains data associated with the first address.

15. The device of claim 14, wherein the write request index is implemented as a Bloom filter.

16. The device of claim 12, wherein the portion of the second memory allocated to store memory access requests is implemented as a queue.

17. The device of claim 12, wherein the portion of the second memory allocated to store memory access requests is implemented as a hash table.

18. The device of claim 12, wherein the portion of the second memory allocated to store memory access requests is implemented as a cache.

19. The device of claim 12, wherein the first memory is non-volatile memory and the second memory is volatile memory.

* * * * *